United States Patent [19]

Moosavian et al.

[11] 3,799,235
[45] Mar. 26, 1974

[54] METHOD AND APPARATUS FOR DESOLVENTIZING ELASTOMERS

[75] Inventors: Seid Hossein Moosavian; Charles Robert Johnson, both of Akron, Ohio

[73] Assignee: The Fuestone Tire & Rubber Company, Akron, Ohio

[22] Filed: Nov. 27, 1970

[21] Appl. No.: 93,357

[52] U.S. Cl. .................. 159/3, 159/4 R, 159/48 R, 264/13
[51] Int. Cl. ........................... B01d 1/16, F26b 3/12
[58] Field of Search ......... 159/2 E, DIG. 10, 47, 48, 159/49, 11, 12, 3, 45 R, 9, 10; 264/13, 141–143

[56] References Cited
UNITED STATES PATENTS

| 765,343 | 7/1904 | Just | 159/49 |
|---|---|---|---|
| 2,006,703 | 7/1935 | Van Marle | 159/11 R |
| 2,087,788 | 7/1937 | Thal | 159/12 X |
| 2,797,767 | 7/1957 | Brooke et al. | 159/2 E UX |
| 2,862,915 | 12/1958 | Nelson et al. | 260/88.1 |
| 2,949,447 | 8/1960 | Hawkins et al. | 260/93.7 |
| 3,050,113 | 8/1962 | Rundquist | 159/13 |
| 3,336,281 | 8/1967 | Eilbracht et al. | 260/94.9 |
| 3,395,746 | 8/1968 | Szabo et al. | 159/47 R |
| 3,442,317 | 5/1969 | Wieland | 159/48 |
| 3,195,613 | 7/1965 | Hawkins | 159/47 |
| 3,072,626 | 1/1963 | Cines | 260/93.5 |
| 3,202,647 | 8/1965 | Todd et al. | 260/94.7 |
| 3,476,736 | 11/1969 | Kahre | 260/96 X |
| 3,586,089 | 6/1971 | Otake-shi et al. | 159/48 X |

FOREIGN PATENTS OR APPLICATIONS

| 685,246 | 2/1960 | Canada | 159/2 E |

OTHER PUBLICATIONS

Polymer Handbook, pp. IV-29, IV-30, IV-31 by Brandrop & Immergut, Interscience Publishers (J. Wiley & Sons).

Primary Examiner—Jack Sofer

[57] ABSTRACT

A method and apparatus for removing volatile material from an elastomer by releasing a pressurized fluid mixture of the elastomer and volatile material into an elongated conduit. Some of the volatile material flashes into vapor and the remaining mixture forms discrete crumbs. The vapor and crumbs exit the conduit into an enclosure maintained at a lower pressure, and the crumbs fall into crumb-collecting means such as a drum drier or a screw conveyor. The crumbs are removed from the enclosure by vapor-tight means such as a sealed screw conveyor or extruder. Vapor is removed at the top of the enclosure, and can be condensed and recycled.

21 Claims, 13 Drawing Figures

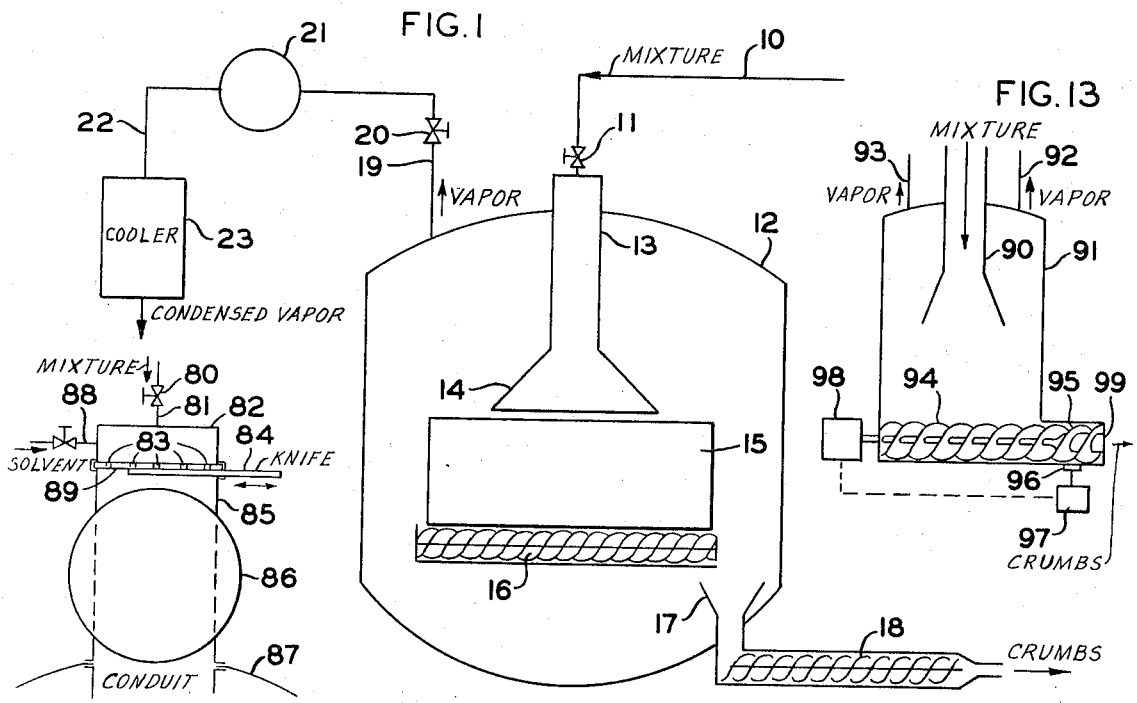
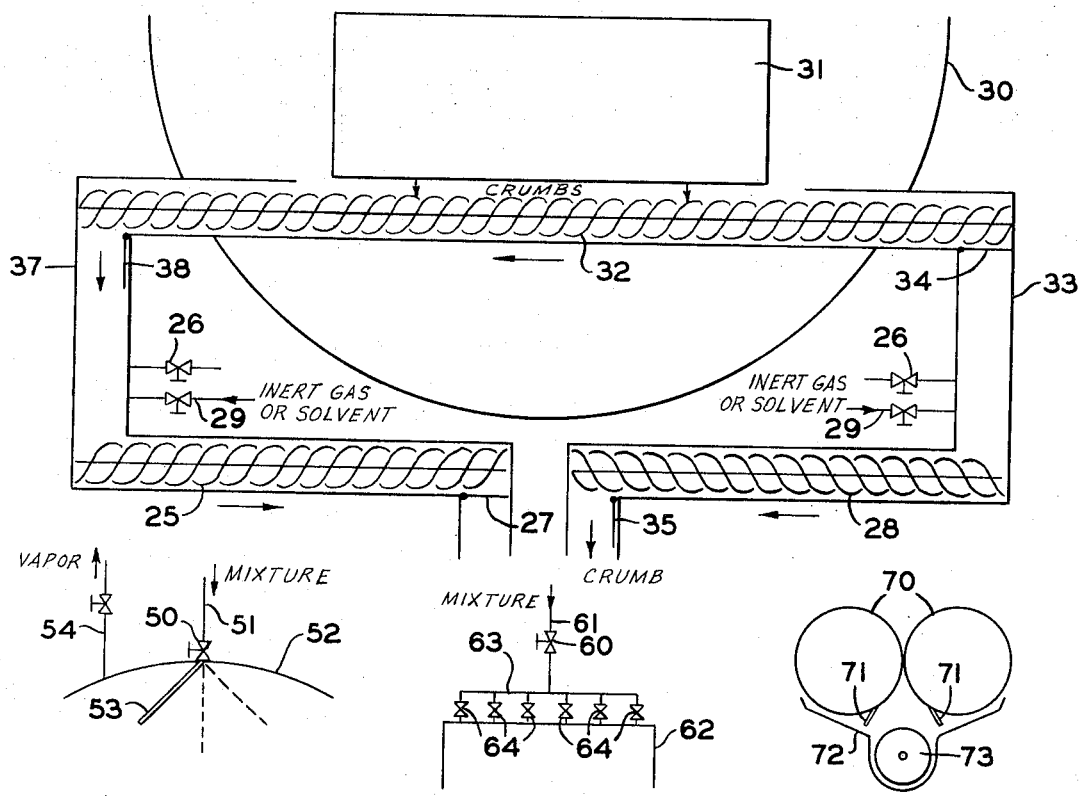

METHOD AND APPARATUS FOR DESOLVENTIZING ELASTOMERS

BACKGROUND OF THE INVENTION

This invention relates to a method of separating volatile materials from fluid mixtures of elastomers dissolved or suspended in the volatile materials.

The use of heated rollers to remove volatile materials from various mixtures is well known. By depositing a fluid mixture at the nip of a pair of counter-rotating rollers, the material is carried through the nip and emerges in a thin film on one or both rolls below the nip. By heating the rolls or the surrounding gas, or both, evaporation of the volatile materials is accomplished, and a film of dried residue is removed from the rolls, with a knife if necessary.

It is known to improve the drying rate of such systems by partially evacuating the space surrounding the rolls to speed the evaporating rate or allow evaporation to occur at a lower temperature. Recovery of the volatiles can be accomplished by compressing and condensing the vapors as they are removed from the drier area.

This technique has been employed in removing the volatiles from polymerization effluents, thus drying and separating the desired polymeric product. U.S. Pat. No. 3,395,746, for example, shows the use of the described technique in separating and recovering polystyrene from a solution of polystyrene in styrene monomer. Since polystyrene is a liquid at elevated temperatures, it can be easily handled using feed temperatures in the area of 175° C., the product emerging as a liquid which is easily pumped away.

The use of such a system as described in the reference patent is considerably more difficult if the polymeric product is not one which is a liquid at convenient temperatures. Certain departures and improvements must be made from this method, for example, to handle high molecular-weight homopolymers of butadiene or isoprene, or copolymers of these monomers with a minor proportion of styrene. Polymers of this type are not liquid at the temperatures shown in the reference patent, and will degrade if subjected to higher temperatures, hence, revised methods of handling them must be found in order to utilize the drum-drier concept efficiently.

For example, if the technique of the reference were employed using a mixture of high molecular-weight polybutadiene and volatiles, instead of forming a "foamy rope" as the reference shows, a cloud of polymer fines and vapor would result.

Another well-known method of removing volatiles from a suspension of solids in the volatiles is by spray drying. The fluid suspension is atomized into a chamber, producing fine particles of the solid material which are separated from the evaporated volatiles. If the particles are cohesive, or "sticky", gathering and handling them presents serious problems. For example, a layer of particles would soon build up on the walls of the chamber, necessitating some method of periodic cleaning of the walls. Additionally, spray drying systems tend to give a build-up of particulate matter around the spray nozzle. Separation of the vapors from the fine solids also can be quite difficult.

SUMMARY OF THE INVENTION

A technique has now been found by which it is possible to treat a fluid mixture of an elastomer and volatile material to remove at least a portion of the volatile material from the mixture.

This technique may be briefly summarized as follows. The mixture of the elastomer and the volatile material, contained in a zone maintained at a temperature above the normal boiling point of the volatile material and at an initial pressure at least sufficient to keep the volatile material in the liquid state, is released through at least one orifice into one end of an elongated conduit, which conduit is at a lower pressure than the initial pressure, whereby a portion of the volatile material flashes into vapor and the remaining mixture forms discrete crumbs, at a rate which produces a vapor velocity in the conduit of from 3 to 70 meters per second and a crumb concentration of from 0.25 to 25 percent by volume in the vapor.

The vapor and crumbs thus formed are conducted out the opposite end of the conduit into crumb collecting means located within an enclosure. The crumbs and vapor are separately removed from the enclosure. Preferred means for collecting the crumbs include screw conveyors and drum driers, the drum driers having horizontally positioned counter-rotating rolls.

Preferred limits for the vapor velocity are from 8 to 40 meters per second, and from 0.25 to 6 percent by volume for the crumb concentration in the vapor. Optionally, hot nitrogen can be added to the fluid mixture before it is released through the orifice. The nitrogen should be added at a temperature of from 90° to 200° C., and at a rate of from zero to 0.625 cubic meters per kilogram of elastomer, the nitrogen volume being calculated at standard temperature and pressure (0° C., and 760 mm Hg).

As another option a similar quantity of nitrogen can be blown against the crumbs in the crumb collecting means to assist in removing volatile material.

The crumbs can be removed from the enclosure by any convenient means, such as through a sealed extruder or screw conveyor. If a drum drier is used, the crumb can be scraped from either or both drier rolls with a scraper. The rolls can be heated to a temperature of from 35° to 200° C. to assist further in removing volatile material.

An apparatus which has been found to be successful in accomplishing the foregoing method can be briefly described as follows. Fluid inlet means is provided, having at least one orifice. An elongated conduit is provided, having an open end and a closed end, the closed end containing the fluid inlet means. The conduit has a minimum cross-section area of about 250 times the total orifice cross-section area, and a maximum cross-section area of about 10,000 times the total orifice cross-section area. The length of the conduit is not critical, but should be at least twice its diameter.

Below the open end of the conduit are crumb collecting means, and a vapor-tight enclosure surrounds the inlet means, crumb collecting means, and at least the open end of the conduit.

Vapor-tight means for removing solids from the enclosure are provided, and means for removing vapor from the enclosure.

If a drum drier is used, the rollers can optionally be internally heated to a temperature of from 35° to 200° C., and can be provided with vertical end dams at opposite ends of the rollers, perpendicular to their axes. As a further option, a pair of internally cooled rectangular plates can be positioned above the rolls and parallel to their axes, with their lower horizontal edges sealed to the rolls and their vertical edges sealed to the optional end dams. The plates can be vertical, or at a slight angle to the vertical position.

The conduit can be cylindrical in shape, or can contain a constriction or an offset. Internal baffles can be provided.

A plurality of orifices can be provided, with means for selectively blocking at least some of the orifices. This means can be individual valves on the orifices, or a slideable knife valve.

BRIEF DESCRIPTION OF THE DRAWINGS

FIG. 1 is a schematic representation of one embodiment of the invention, showing material to be treated entering an enclosure through a conduit and crumb leaving through a sealed extruder. Vapor is removed and recovered.

FIG. 2 is a fragmentary schematic drawing depicting an alternate method of removing crumb through a combination of screw conveyors.

FIG. 9 is a fragmentary schematic drawing featuring a reciprocating conduit.

FIG. 10 is a fragmentary schematic drawing depicting a plurality of orifices within the conduit.

FIG. 11 is a fragmentary schematic end-view of drier rolls with a screw conveyor.

FIG. 12 is a fragmentary schematic drawing of an embodiment for releasing the mixture into the conduit.

FIG. 13 is a fragmentary schematic representation of a variation of the embodiment shown in FIG. 1.

DETAILED DESCRIPTION OF THE INVENTION

Figure 3:
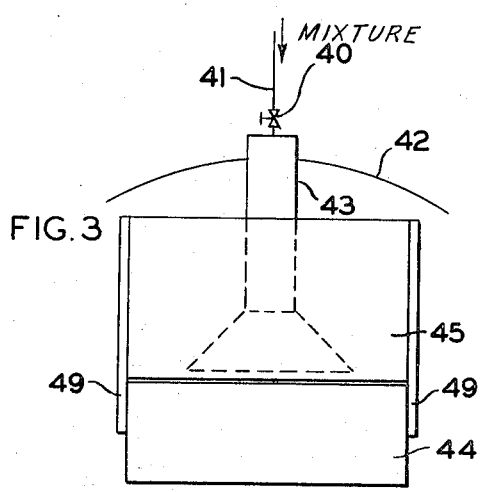
FIGS. 3 and 4 are fragmentary schematic front and side drawings showing a conduit with one method of containing crumb above drier rolls.

A better understanding of the method of the invention may be obtained by reference to the accompanying drawings and descriptions.

One embodiment of the method of the invention is shown in FIG. 1, wherein the mixture to be treated enters under pressure through line 10, and is controlled by valve 11. The mixture is released into conduit 13 which has a narrower flared lower portion 14 inside the enclosure 12 to maintain vapor velocity in the conduit and spread crumbs across the width of drum drier rolls 15. The crumbs fall onto the rolls 15, are carried between the rolls and fall into a screw conveyor 16, thence to the hopper 17 of a sealed extruder 18 which removes the crumbs from the enclosure. Vapors are removed from the enclosure 12 through line 19, which is controlled by valve 20, to the compressor 21. After being compressed, the volatile materials flow through line 22 into a cooler 23 from which they are removed.

FIG. 2 shows a variation of the embodiment depicted in FIG. 1, and is presented in a fragmentary detail. The elastomer crumbs fall from drum drier rolls 31 located within an enclosure 30 onto a screw conveyor 32 which is arranged to be driven in either direction. Screw conveyor 32 is shown operating in the direction indicated by the arrow, to carry the crumb into a vapor tight compartment 37 through flap valve 38 which is in the open position. The crumb falls through compartment 37 into second screw conveyor 25, operating in the direction of the arrow. At its opposite end, conveyor 25 is closed off by flap valve 27.

At the opposite end of conveyor 32 another vapor tight compartment 33 is closed off by a flap valve 34. At the bottom of compartment 33 a third conveyor 28 operates in the direction of the arrow to convey crumb past an open flap valve 35 and out of the system. The direction in which conveyor 32 operates and the positions of the flap valves 27, 34, 35, and 38 are controlled to provide alternate continuous crumb removal through a gas-tight seal. Valved vacuum lines 26 are connected to containers 33 and 37 to provide for evacuation of the containers, and valved lines 29 provide for introduction of inert gas or solvent vapor to containers 33 and 37 for excluding air when the vacuum is broken for crumb discharge.

Figure 4:
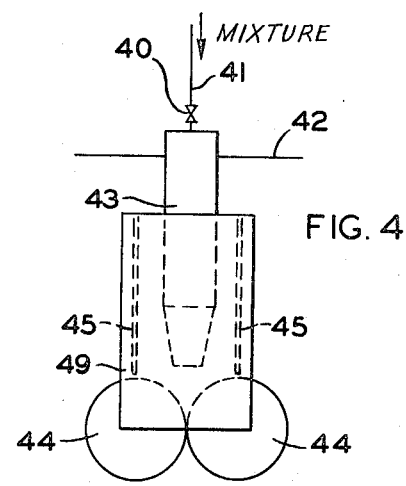

FIGS. 3 and 4 are front and side views respectively of one arrangement of the conduit. In both figures the mixture to be treated enters through line 41 and is controlled by valve 40. The mixture is released into conduit 43, exits into enclosure 42 and falls onto the drum drier rolls 44. A pair of parallel plates 45 are positioned above the rolls and sealed to end dams 49 to contain polymer crumb particles. Both the end dams and plates can be internally cooled, if desired.

Figure 5:
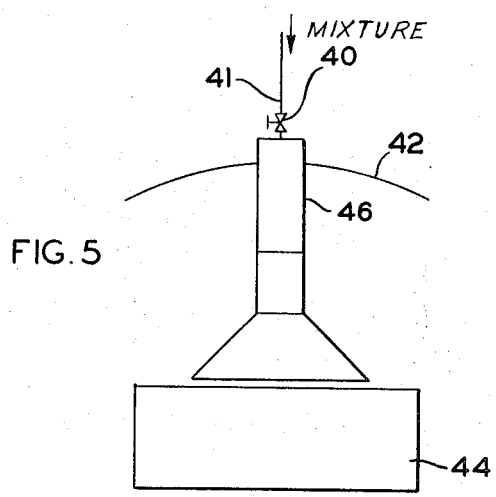
FIGS. 5 and 6 are fragmentary schematic front and side views of an embodiment which is a variation of that shown in FIGS. 3 and 4.
Figure 6:
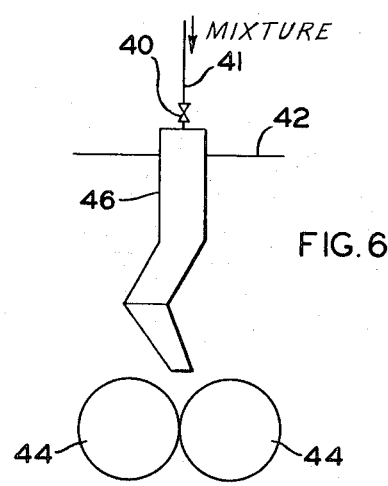
Figure 7:
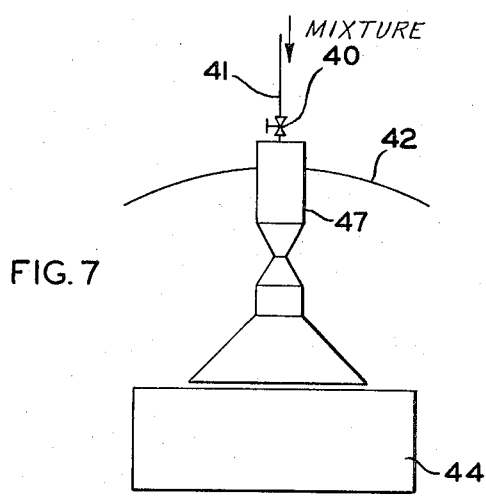
FIGS. 7 and 8 are fragmentary schematic front and side views of another variation of the embodiment shown in FIGS. 3 and 4.
Figure 8:
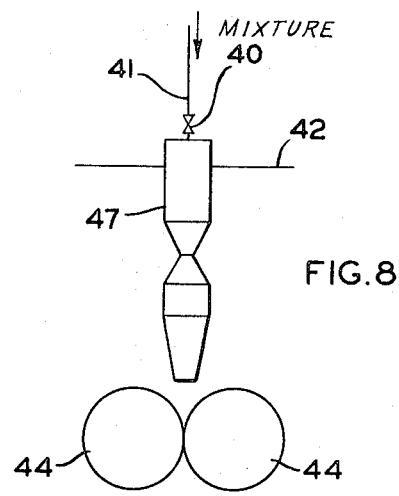

FIGS. 5 and 6 are front and side views respectively of another variation in the conduit. Here again the mixture to be treated enters through line 41 and is controlled by valve 40. The mixture is released into conduit 46 which contains a bend or offset clearly shown in FIG. 6, and exits the conduit into enclosure 42. The crum balls onto drier rolls 44 as in FIGS. 3 and 4. FIGS. 7 and 8 are front and side views of still another variation in the conduit. Here again the mixture to be treated enters through line 41 and is controlled by valve 40. The mixture is released into conduit 47 which contains a constriction near its midpoint, and exits the conduit into enclosure 42. The crumb falls onto drier rolls 44.

FIG. 9 shows a design for a reciprocating orifice through which the mixture is released. In the figure the mixture enters through line 51 and is controlled by valve 50. A reciprocating conduit 53 inside enclosure 52 releases the mixture above the rolls in an arcuate pattern so as to provide wide distribution of the crumb across the rolls (not shown). Valved line 54 removes vapors near the top of the enclosure 52.

FIG. 10 shows another orifice arrangement wherein the mixture enters through line 61, is controlled by valve 60 and enters a manifold 63. The mixture is released into conduit 62 through a plurality of small valves 64.

FIG. 11 shows in an end-view a method whereby the crumb is collected beneath drier rolls in a screw conveyor. Crumb passes between drier rolls 70 and is removed from either or both of the rolls, if necessary, by knives 71. The crumb then falls into trough 72 of the conveyor and is taken away by the rotation of the worm 73.

FIG. 12 shows another alternative arrangement for introducing the mixture into the enclosure. The mixture is controlled by a valve 80 and enters an enclosed chamber 82 through a line 81. The liquid mixture within the chamber exits through a plurality of orifices 83, in an orifice plate 89 some of which orifices are blocked by a knife 84, moveable in the directions shown by the arrows. The orifices 83 can be made removable so that by interchanging them the total effective cross-section area of the orifices can be changed as desired. The mixture enters the conduit 85, forming vapor and crumb, and passes through a full-port ball valve 86, shown in the open position. Vapor and crumb continue downward into an enclosure 87, and fall onto collecting means (not shown). By closing valve 86 the upper portion of conduit 85 can be sealed off from the enclosure 87. A valved solvent line 88 provides for introduction of solvent into chamber 82 for cleaning purposes.

FIG. 13 shows an embodiment wherein the means for collecting the crumb is a screw conveyor. Referring to the drawing, the mixture to be treated enters conduit 90 through an orifice system (not shown) and flashes into crumbs and vapor. The crumbs and vapor, traveling in the direction of the arrow, leave the open end of the conduit 90 and enter enclosure 91, falling onto a screw conveyor 94. The vapor is removed at the top of the enclosure 91 through vapor lines 92, 93. The conveyor moves the crumbs through a restricted section 95 and out of conveyor 94 at its exit 99. A pressure sensor 96 sends a signal to a controller 97 which signal is proportional to the pressure in the restricted section 95. The controller 97 sends a signal to a variable speed drive motor 98 connected to drive the conveyor. By automatically adjusting the speed of the conveyor 94 in this way a plug of elastomer crumbs is maintained in the restricted section 95 to seal the conveyor at that point and prevent the passage of vapor or gases in or out of the enclosure 91. If necessary, the lower walls of the enclosure 91 adjacent the conveyor 94 can be sloped outward to minimize crumb adhesion to the walls.

The fluid mixture of elastomer and volatiles which is the starting material in the process of the invention is typically the effluent from a polymerization vessel, but can be any such mixture from which it is desired to remove at least a portion of the volatiles. In the usual case wherein the starting material is the product of a polymerization reaction which product contains diluent and/or unreacted monomers, the mixture contains sufficient volatile material to produce a solution or suspension fluid enough to be moved through a pipe. For the typical materials contemplated, the volatile content of the incoming mixture will usually be from about 200 to 600 percent by weight of the elastomer. Expressed in another way, the elastomer content of the typical mixture is about 14 to 33⅓ percent.

Mixtures containing greater or lesser amounts of volatiles are within the scope of the invention, the only limitation being that the mixture is sufficiently fluid to be treated.

The temperature of the mixture to be treated should preferably be above the normal boiling point of the volatiles, and is preferably relatively high, since much of the sensible heat of the mixture is required to vaporize the volatiles as the mixture enters the conduit. Depending on the nature of the volatiles, a temperature of from about 100° to 200° C. is usually advantageous and, using the preferred diluents, from about 120° to 160° C. is preferred. Higher temperatures may be harmful to the elastomer or solvent, or both, and more difficult to handle, while temperatures lower than 100° C. may result in insufficient removal of the volatiles.

The mixture to be treated should be under sufficient pressure to keep the volatiles in the liquid phase before they pass the orifice. With the recommended diluents a pressure of from 5 to 20 atmospheres is recommended, although higher or lower pressures can be used.

The type of elastomer contained in the mixture to be treated is not particularly critical to the operation of the method of the invention; however, the method is especially designed to treat those elastomers which are solid throughout the temperature range employed. Elastomers which are most successfully treated include butadiene or isoprene homopolymers, butadiene-isoprene copolymers, and copolymers of butadiene or isoprene with a minor proportion of styrene. Such elastomers are solids at the temperatures used in the method if they have average molecular weights in excess of about 100,000.

Other elastomers which can be successfully treated include natural rubber, copolymers of butadiene or isoprene with acrylonitrile, unsaturated carboxy acids and their esters, vinyl pyridine, and other such copolymerizable monomeric materials.

If the mixture is the effluent from a polymerization process, the catalyst can be de-activated before beginning treatment, or, alternatively, the "live" polymer mixture can be treated. By excluding materials which would de-activate or poison the catalyst the volatiles can be recycled to the polymerization process without the need for purification.

The volatile material normally encountered in mixtures to be treated will generally be an inert diluent. Diluents can be hydrocarbons, either aliphatic, or aromatic or cycloaliphatic, containing from four to 10 carbon atoms, or $C_4$ to $C_{10}$ alcohols, ethers, or amines. Most common are straight- or branched-chain aliphatic hydrocarbons, such as butanes, pentanes, hexanes, or heptanes. Aromatics, such as benzene, or napthalene; alkyl-substituted aromatics, such as toluene or xylene; and cycloalkanes such as cyclohexane are also commonly used as diluents, and can be present in mixtures to be treated according to the invention. Commercial hexanes and pentanes are most commonly encountered.

The elastomer can be merely suspended in the diluent or partially, or completely dissolved in the diluent. If the mixture is a polymerization effluent, it can contain unreacted monomers and/or modifiers. In the case of polymers from conjugated diene monomers, butadiene-1,3 and isoprene will sometimes be present. If mass-polymerization effluent is treated, substantial amounts of unreacted monomer must be removed.

The normal boiling points of the volatiles usually found will range from about −40° to 180° C., although higher or lower boiling materials can be advantageously handled.

Since the mixture is treated at an initial temperature above the normal boiling point of the volatile materials encountered, an intial pressure which is above normal atmospheric pressure must be used. This initial pressure can be as little as a fraction of an atmosphere or as much as 20 atmospheres or more above atmospheric.

Upon release from the zone of higher initial pressure, the mixture passes through the orifice into one end of the conduit. The conduit, which opens at its opposite end into the enclosure, is at a lower pressure then the initial pressure, and the resulting pressure drop will cause a portion of the volatile material to flash into vapor and the remaining mixture to form discrete crumbs. By controlling the rate at which vapor is removed from the enclosure the pressure within the enclosure is regulated to a desired level.

This desired pressure level within the enclosure will be determined by a number of factors, including the boiling point of the volatile material and its concentration in the mixture, the flow rate of the fluid mixture, and the temperature of the mixture. The desired pressure level is preferably atmospheric pressure or below, although it can be up to 2 atmospheres or higher.

As a result of the flashing into vapor of a portion of the volatile material a large volume increase results, and the remaining mixture forms crumbs. The combination of vapor and crumbs travel the length of the conduit and exits the conduit at its open end. Within the conduit the volume concentration of crumbs in the vapor and the vapor velocity must be controlled in order to practice the method of the invention. Experiments have shown that when the crumb concentration and vapor velocity are within specified limits the crumbs will agglomerate so as to limit the production of fines, and to avoid plugging the conduit or adhering crumbs to the walls of the conduit.

It is sometimes desirable to jacket or insulate the conduit or the enclosure, or both, to retain heat. Steam tracing or jacketing can be supplied where additional heat is required.

A workable crumb concentration of between 0.25 and 25 percent by volume, and preferably between 0.25 and 6 percent by volume, in the vapor has been determined. Concentrations below the minimum figure tend to reduce the agglomeration effect, and generally reflect uneconomically low production rates. Concentrations above the maximum figures tend toward a clogging condition, as well as insufficient removal of volatile material.

Similarly, vapor velocities in the conduit should be controlled between 3 and 70 meters per second, and preferably between 8 and 40 meters per second. Velocities slower than the minimum figures given are generally insufficient to keep crumbs from adhering to the conduit walls, and velocity figures higher that the recommended values hamper agglomeration and cause the crumbs to fly about excessively on leaving the open end of the conduit.

Optionally, heated nitrogen can be introduced into the fluid mixture just ahead of the orifice. This variation adds additional heat to the system, and lowers the crumb concentration in the conduit, while increasing the vapor velocity in the conduit. For the purposes of the velocity and concentration limits the nitrogen can be calculated as a portion of the vapor. From 0 to 0.625 cubic meters or nitrogen per kilogram of elastomer (calculated at 0° C. and 760 mm of Hg) is recommended for the level of use, and a temperature range of from 90° to 200° C. Although nitrogen is recommended, any inert gas can be substituted for nitrogen, avoiding oxygen or air.

The vapor and crumbs which forms in the conduit are conducted out the open end of the conduit into crumb collecting means. This means can be any convenient device to catch the crumbs and mass them together for convenient removal. Recommended means include screw conveyors and/or drum driers. The crumbs fall into the collecting means, and the vapor is removed from the enclosure which surrounds the rolls and the open end of the conduit. Vapor removal is accomplished preferably by means of a compressor which can be operated so as to produce a partial vacuum within the enclosure.

Because of the agglomeration which has taken place in the conduit, and because of the reduction in velocity which occurs as the crumbs and vapor leave the conduit, the crumbs tend to fall directly into the collecting means with a minimum of blowing about.

Vapor velocities within the enclosure but outside the conduit should be kept at a minimum, and preferably below about 2 to 3 meters per second, minimizing or eliminating entrainment of crumbs in the vapor removal step. If desired, however, the crumbs can be guided into the collecting means by the plate arrangement as described above, in combination with a drum drier, or with a screw conveyor.

If drier rolls are employed, they are positioned horizontally, and are counter rotating so as to pass the crumbs through their nip, which has a close clearance, preferably from about 0.13 to 2.5 mm. If necessary, a scraper can be used to remove any crumbs which adhere to one or both of the rolls. The rolls can optionally be heated to a temperature of from 35° to 200° C., to provide for further evaporation of volatile material from the crumbs. The rolls are optionally rotated at unequal speeds, to provide a masticating effect. Optional internal cooling of the end dams or plates, or both (as shown in FIGS. 3 and 4) will condense some of the volatile material to wash down any crumbs adhering thereto.

The crumbs are then removed from the enclosure by any convenient means. One preferred means employs a sealed screw conveyor, which catches the crumbs and conveys them to the conveyor discharge outside the enclosure. By providing a restricted section in the conveyor a plug of elastomer will seal the conveyor, if a seal is desired, as when the enclosure is partially evacuated. Restricted sections can be effected by reducing the screw pitch in the conveyor and/or increasing the shaft root diameter. Alternatively, a flap valve arrangement (as discussed above) can be provided, whereby crumb can be continuously removed from alternate conveyor sections without admitting or releasing gaseous material from the enclosure.

An extruder can be substituted for the screw conveyor, and will provide a gas-tight seal in a similar manner.

When a greater degree of volatile removal is desired, and a drum drier is employed, hot nitrogen can optionally be blown against the crumbs as they emerge below the rolls. From 0 to 0.625 standard cubic meters (measured at 0° C. and 760 mm Hg) per kilogram of elastomer is recommended, and nitrogen temperatures of 90° to 200° C. are preferred. The nitrogen is then removed along with the vapor. If a screw conveyor is used to collect the crumb, hot nitrogen can be injected along the base of the conveyor with similar beneficial effect and by heating the conveyor walls and/or screw, additional vaporization is obtained.

Apparatus which is designed to perform the method of the invention has been shown in the drawings and described above. A variety of alternative means can be used to advantage, and the dimensions should be selected to provide for operation which will handle the desired throughput and perform the desired degree of volatile material removal. All of the volatile material can be removed, or only a portion thereof, with remaining volatiles removed by subsequent operations, if desired.

A more complete understanding of the invention can be obtained by reference to the following examples, in which all percentages are by weight, unless otherwise indicated.

EXAMPLE I

In order to study the process of the invention, and to determine operating ranges for the variables, a series of trials was performed on a pilot unit.

A 25 percent solution of an 80/20 butadiene/styrene copolymer in hexane was heated to 125° C. and maintained under a pressure of about 11 atmospheres. The mixture was valved through a slightly-opened gate valve into a cylindrical conduit having a diameter of about 51 mm. which was about 76 cm. long, with a 45° bend. The conduit then flared into an opening above the drier rolls 15.2 cm. by 7.6 cm. The vapors and crumb which were formed dropped onto the drum drier, which had two 15.2 cm. diameter rolls 19.4 cm. long, separated by a space of about 0.25 to 0.50 mm. The walls of the enclosure and of the portion of the conduit outside the enclosure were insulated and steam-traced to provide near constant temperature operation and to prevent condensation.

The rolls were steam heated to 160° C., and were rotated in opposite directions at 20 revolutions per minute. The space within the enclosure surrounding the drier rolls and the open end of the conduit was maintained at a pressure of about 0.17 atmospheres, and a temperature of 50° C. The hexane vapor was removed, and condensed. The cross-section area of the gate valve was calculated to be about 0.02 cm$^2$; that of the conduit, 20.2 cm$^2$; and that of the flared section 115 cm$^2$. Thus the upper portion of the conduit and the flared section measured about 1,000 and 5,600 times the cross-section area of the valve opening, respectively.

Observations and results of several trials are summarized in the following table:

| TRIAL | FEED RATE, Kg. per hour | % HEXANE IN PRODUCT |
|---|---|---|
| 1 | 169 | 27.4 |
| 2 | 204 | 27.8 |
| 3 | 175 | 18.0 |
| 4 | 134 | 15.0 |

During the trials the average residence time of the crumb within the enclosure was about 16 seconds. The concentration of the crumb in the vapor was calculated to be about 2.8 percent by volume. The average velocity of the mixture of crumb and vapor in the upper (unflared) portion of the conduit was calculated as about 28 meters per second. Only a slight blowing about of fines above the rolls was observed, and the average vapor velocity in the enclosure (but outside the conduit) was about 0.2 meters per second.

EXAMPLE II

A cylindrical conduit having a diameter of 2.54 cm. was substituted for the conduit used in Example I, and the example was repeated. The ratio of the cross-section area of this smaller conduit to the cross-section area of the orifice calculated to approximately 250:1. A constriction on the open end of the conduit reduced the minimum cross-section area of the conduit to considerably less than 250 times that of the orifice.

On releasing the fluid mixture through the orifice the conduit rapidly plugged, and the flow stopped. The constriction was then removed and the flow began, but the crumb concentration was such that the crumbs massed together and left the conduit in a porous strand.

EXAMPLE III

The procedure of Example I was repeated, except that the conduit was removed completely, and the mixture was released into the enclosure unconfined. A cloud of fine crumbs resulted, and the crumbs rapidly adhered to the walls of the enclosure. Only a minor portion of the crumbs could be passed between the drier rolls, and the trial was discontinued. The cross-section area of the enclosure was calculated to be in excess of 30,000 times that of the orifice.

We claim:

1. The method of treating a fluid mixture of an elastomer which is a polymer from butadiene and/or isoprene, optionally with styrene and which elastomer has an average molecular weight in excess of about 100,000 and a volatile material to remove at least a portion of the volatile material from the mixture, comprising the continuous steps of releasing the mixture from a zone maintained at a temperature above the normal boiling point of the volatile material and at an initial pressure at least sufficient to keep the volatile material in the liquid state through at least one orifice into one end of an elongated conduit, which conduit is at a lower pressure than the initial pressure, said conduit having a uniform minimum cross-section area of about 250 times the orifice cross-section and said conduit opening into a diverging portion having a maximum cross-section area of about 10,000 times the orifice cross-section, whereby a portion of the volatile material is flashed into vapor and the remaining mixture forms discrete crumbs, at a rate which produces a vapor velocity in the conduit of from 3 to 70 meters per second and a crumb concentration of from 0.25 to 25 percent by volume in the conduit, conducting the vapor and crumbs thus formed out the opposite end of the conduit into an enclosure and into crumb collecting means located within the enclosure, removing the vapor from within the enclosure, and removing the crumbs from the enclosure.

2. The method of claim 1, wherein the vapor velocity is from 8 to 40 meters per second, and the crumb concentration is from 0.25 to 6 percent by volume.

3. The method of claim 1, wherein from 0 to 0.625 standard cubic meters of 90° to 200° C. nitrogen per kilogram of elastomer is added to the fluid mixture before the mixture is released through the orifice.

4. The method of claim 1, wherein from 0 to 0.625 standard cubic meters of 90° to 200° C. nitrogen per kilogram of elastomer is blown against the crumbs in the crumb collecting means.

5. The method of claim 1, wherein the enclosure is partially evacuated.

6. The method of claim 1, wherein the volatile material in the initial mixture is present in an amount of from 200 to 600 percent by weight based on the elastomer.

7. The method of claim 1, wherein the volatile material is an aliphatic, aromatic or cycloaliphatic hydrocarbon containing from four to 10 carbon atoms.

8. The method of claim 1, wherein the initial pressure is from 5 to 20 atmospheres.

9. Apparatus for removing volatile materials from a fluid mixture of an elastomer and the volatile materials comprising in combination fluid inlet means having at least one orifice, an elongated conduit having a uniform minimum cross-section area of about 250 times the total orifice cross-section area along an extended length of the conduit, and opening into a diverging section of the conduit having a maximum cross-section area of about 10,000 times the total orifice cross-section area which conduit has an open end and a closed end, the closed end containing the fluid inlet means, crumb collecting means positioned below the open end of the conduit, a vapor-tight enclosure surrounding the inlet means, crumb collecting means, and at least the open end of the conduit, means for removing vapor from the enclosure, and vapor-tight means for removing solids from the enclosure.

10. Apparatus as in claim 9, wherein the conduit is cylindrical in shape.

11. Apparatus as in claim 9, wherein the conduit contains a constriction.

12. Apparatus as in claim 9, wherein the conduit contains an offset.

13. Apparatus as in claim 9, wherein the crumb collecting means comprises at least one screw conveyor.

14. Apparatus as in claim 9, wherein the crumb collecting means comprises two parallel, counter-rotating cylindrical rollers.

15. Apparatus as in claim 14, wherein the rollers are internally heated.

16. Apparatus as in claim 14, wherein vertical end dams are positioned at opposite ends of the rollers, perpendicular to their axes.

17. Apparatus as in claim 16, including a pair of internally cooled rectangular plates above the rolls and parallel to their axes, with their lower horizontal edges sealed to the rolls and their vertical edges sealed to the end dams.

18. Apparatus as in claim 9, wherein a plurality of orifices is provided, with means for selectively blocking at least some of the orifices.

19. Apparatus as in claim 18, wherein the means for selectively blocking at least some of the orifices consists of individual valves on the orifices.

20. Apparatus as in claim 18, wherein the means for selectively blocking at least some of the orifices comprises a slideable knife valve.

21. Apparatus as in claim 18, wherein the plurality of orifices are removeable and interchangeable.

* * * * *

UNITED STATES PATENT OFFICE
CERTIFICATE OF CORRECTION

Patent No. 3,799,235        Dated March 26, 1974

Inventor(s) Seid Hossein Moosavian and Charles Robert Johnson

It is certified that error appears in the above-identified patent and that said Letters Patent are hereby corrected as shown below:

On the title page, "The Fuestone Tire & Rubber Company" (Assignee) should read --The Firestone Tire & Rubber Company--.

Column 4, Line 37, "crum balls" should read --crumb falls--.

Column 7, Line 61, "or" should read --of--.

Signed and sealed this 17th day of September 1974.

(SEAL)
Attest:

McCOY M. GIBSON JR.
Attesting Officer

C. MARSHALL DANN
Commissioner of Patents